Aug. 9, 1949.   J. H. BOLLMAN   2,478,740
ELECTRONIC MOTOR CONTROL APPARATUS
Filed March 28, 1945
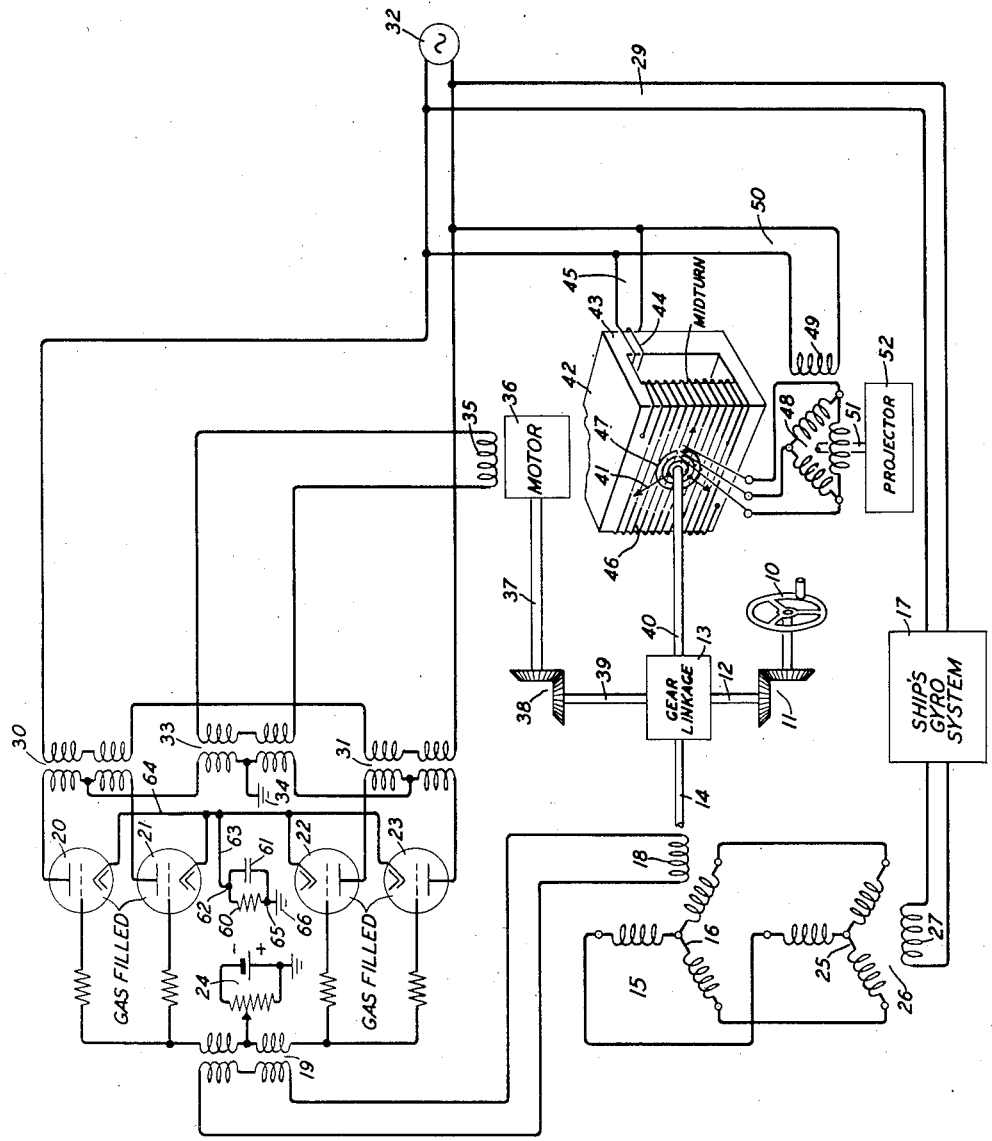
INVENTOR
J. H. BOLLMAN
BY
H. A. Burgess
ATTORNEY Patented Aug. 9, 1949

2,478,740

UNITED STATES PATENT OFFICE 2,478,740

ELECTRONIC MOTOR CONTROL APPARATUS

John H. Bollman, Rutherford, N. J., assignor to Bell Telephone Laboratories, Incorporated, New York, N. Y., a corporation of New York Application March 28, 1945, Serial No. 585,319

6 Claims. (Cl. 318—30)

This invention relates to a motor control system, and particularly to such system for rotating an object in such manner as to anticipate the final position of the rotated object.

In certain known motor control systems, the motor is utilized by means of a suitable mechanism to rotate an object to a certain position. In such systems it has been found that the motor tends to drive the object too far because of the inertia of the mechanism embodying the motor. This tends to cause the motor to be so energized as to reverse its direction and thereby that of the object, and drive the object too far in the reverse direction. These reversals may be repeated a number of times before the system is brought to a state of rest. Such overshooting tends to introduce hunting in the motor control system whereby undesirable time intervals are introduced in the motor control system.

The present invention contemplates such movement of an object that it is driven up to the final position which it is to occupy without substantial overshooting.

The object of the invention is to provide a motor control system capable of moving an object up to its final position without hunting or overshooting.

The present invention will be disclosed as embodied in an otherwise known type of motor control system and its nature and mode of operation will be described after first disclosing the known system. It may be stated, however, that the invention in the specific form disclosed comprises an electrical storage circuit for building up a counter control opposing and eventually nullifying the operating voltage of the motor system as the driven member approaches its intended stopping point, whereby the driving power for the motor is effectively shut off slightly in advance of such stopping point allowing the inertia of the system to carry the driven member from there on up to its stopping point.

The present invention will be readily understood from the accompanying drawing which shows a motor control system embodying a specific form of the invention.

In the drawing a handwheel 10 is connected through gears 11, shaft 12, differential gear linkage 13, and shaft 14 to rotor winding 18 of synchro-control transformer 15. Three-phase winding 16 constituting the stator of the transformer 15 is connected to a three-phase winding 25 forming the stator of a synchro generator 26 which also includes a rotor winding 27. The latter winding is connected to the ship's gyro system 17 for a purpose that will hereinafter appear. Rotor winding 18 is connected to the input winding of a transformer 19 whose output winding is connected to the input circuits of three-element gas tubes 20, 21, 22 and 23. A potentiometer 24 serves to bias the grids of these tubes.

The anodes of tubes 20 and 21 are connected together through the split primary winding of a transformer 30; and the anodes of tubes 22 and 23 are connected together through the split primary winding of a transformer 31. The secondary windings of both transformers 30 and 31 are serially connected to a source 32 of alternating voltage. The mid-points of the primary windings of transformers 30 and 31 are connected through the split primary winding of an output transformer 33, which latter winding has its mid-point connected to ground 34. Leads 29 connect the alternating current source 32 to the ship's gyro system 17.

The output winding of transformer 33 is connected to winding 35 of a spinner motor 36 which is joined by shaft 37, gears 38, shaft 39, gear linkage 13, and shaft 40 to brushes 41 of a commutator transmitter 42. These brushes comprise three in number, each being spaced 120 degrees from the others. This transmitter includes a core 43 embodying a primary winding 44 connected by leads 45 to the alternating current source 32, and a secondary winding 46 with which the arms 41 are in slidable engagement. Three concentric rings 47 each of which is associated with one of the three brushes 41 are connected to the three-phase winding of training motor 48 which embodies a single phase winding 49 connected by leads 50 to the alternating current source 32. A shaft 51 joined to both the training motor 48 and projector 52 rotates the latter in clockwise or counter-clockwise directions in a manner that will be presently explained.

In the operation of the circuit portion above described the potentiometer 24 is adjusted to bias the grids of the tubes 20, 21, 22 and 23 and thereby prevent these tubes from firing in the absence of an input voltage from the transformer 19. This indicates a balanced electrical condition in the transformer 15, that is, such relation of the position of the rotor winding 18 with reference to the stator windings 16 that the magnetic field effective in the transformer 15 induces no voltage in the rotor winding 18. In this connection it will be understood that the voltage for exciting the transformer 15 is obtained from the ship's gyro system in the circuit previously traced.

Electrical unbalance is established in the transformer 15 by (1) a change in the magnitude of the three-phase voltage effectively supplied by stator windings 25 to stator windings 16, and (2) rotation of the rotor winding 18 by an actuation of the handwheel 10. In connection with (1), the magnitude of the voltage induced in the stator windings 25 and supplied to the stator windings 16 is determined by the amount of the rotation of the rotor winding 27 relative to its associated stator windings 25. The amount and duration of such rotation, clockwise or counterclockwise, of the rotor winding 27 depends on the change of the ship's course either to the port or starboard direction. Hence, the effective magnitude of the voltage supplied by the stator windings 25 to the stator windings 16 depends on the change in the ship's course. This voltage introduces an unbalanced condition in the transformer 15. In connection with (2), the unbalance is established when, with no change in the magnitude of the voltage supplied to the stator windings 16 as described above under (1), the rotation of handwheel 10 causes actuation of shafts 12 and 14 and gear linkage 13 and thereby rotation of the rotor winding 18. This introduces an unbalanced condition in the transformer 15. Due to suitable differential gearing in the gear linkage 13, rotation of handwheel 10 actuates the rotor winding 18 but does not affect the position of the brushes 41 on the commutator transmitter 42.

When the unbalanced condition is introduced in the transformer 15 by either (1) or (2) above, a voltage is induced in the rotor windings 18 with a magnitude depending on the amount of rotation of rotor winding 18 or 27, and with a phase depending on the direction of such rotation. The voltage developed in the rotor winding 18 is applied through transformer 19 to the input circuits of tubes 20, 21, 22 and 23. These tubes are essentially an electronic relay for reversing the phase of the voltage applied to the motor winding 35 from the alternating current source 32 in a manner to be explained hereinafter. The constants of the input circuits of these tubes are so chosen that the latter fire with approximately one-half degree displacement of the rotor windings 18 and 27 with reference to that position at which the respective transformers 15 and 26 would be balanced in an electrical sense.

The anode circuits of tubes 20, 21, 22 and 23 are supplied through the transformers 30 and 31 with an alternating voltage of approximately 225 volts from the source 32. These tubes are so arranged in circuit that they fire only when their grid and anode voltages are in phase. Hence, for one direction of rotation of either rotor winding 18 or rotor winding 27, and therefore for a given phase of the voltage applied to their grids, only tubes 20 and 23 will fire; and for the opposite direction of rotation of either rotor winding 18 or rotor winding 27, and therefore for a 180-degree change in phase for the voltage applied to their grids, only tubes 21 and 22 will fire. As the alternating current source 32 is connected to the ship's gyro system 17, the proper phasing of the voltages in the input and output circuits of the tubes 20, 21, 22 and 23 is effected.

When the tubes 20 and 23 are fired, a voltage of 225 volts and given phase is applied through transformer 33 to the winding 35 of motor 36 whereby the latter is caused to rotate in a given direction. When the tubes 21 and 22 are fired, a voltage of 225 volts and 180-degree change of phase is supplied through transformer 33 to the winding 35 of motor 36 causing the latter to rotate in the opposite direction.

Rotation of the motor 36 effects rotation of shaft 37, gears 38, shaft 39, gear linkage 13 and shaft 40 and thereby rotation of the brushes 41 on commutator transmitter 42. The relative geometrical positions of the three brushes 41 with reference to the mid-turn of secondary winding 46 determines the magnitude and phase relationship of the three-phase voltage supplied to the three-phase winding of the training motor 48. The interaction of the magnetic fields due to the voltages effective in such three-phase and single phase windings produces a torque whose direction and magnitude depend on the relative magnitude and phase of the voltages in the respective windings. This torque effects rotation of the shaft 51 and thereby the projector 52 in either clockwise or counter-clockwise directions.

As the projector 52 is being rotated in the foregoing manner, the motor 36 also effects rotation of the shaft 14 and rotor winding 18 attached thereto. This rotation is such that it tends to restore electrical balance in the transformer 15 whereupon the induction of a voltage in the rotor winding 18 is substantially terminated. Consequently, the pair of tubes 20 and 23, or 21 and 22 cease firing and thereby cause discontinuance of the voltage to the winding 35.

The gearing is so arranged that one rotation of hand-wheel 10 effects approximately 5 degrees' rotation of the projector 52; and that whatever change is made in the position of the ship's bearing with respect to true north, the projector 52 is caused to rotate a sufficient amount in the proper direction to maintain the projector 52 in true bearing and at the same time electrical balance is caused to be reestablished in the transformer 15. For example, if the ship's position is changed 10 degrees to port or starboard with respect to true north, the projector 52 is rotated a sufficient amount in the proper direction to a position corresponding to that of the ship with reference to true north, and the rotor winding 18 is rotated 10 degrees from its original position in order to reestablish electrical balance in the transformer 15.

In accordance with the present invention, a resistor 60 and capacitor 61 are connected in parallel such that one common terminal 62 is joined by lead 63 to lead 64 which is common to the cathodes of the tubes 20, 21, 22 and 23; and such that a second common terminal 65 is connected to ground 66.

In the operation of the invention, the firing of tubes 20 and 23, or 21 and 22 causes the capacitor 61 to obtain a charge in the circuit including ground 34, primary winding of transformer 33, windings of transformers 30 and 31 connected to the anodes of tubes 20, 21, 22 and 23, anode-cathode circuits of the fired tubes, common cathode lead 64, lead 63, capacitor 61 and ground 66. The charge on capacitor 61 supplies an additional bias to the grids of the fired tubes to cause them to cease firing when the rotor winding 18 is approximately 3 degrees away from that position at which the transformer 15 would have electrical balance restored thereto. Thereafter, the inertia of the mechanical system causes the rotor winding 18 to coast to the balanced position without hunting or substantial overshooting.

To take one illustration: For a rotation of the motor winding 18 approximately up to 3 degrees in either direction in response to a similar change in the ship's course or an actuation of the handwheel 10 as hereinbefore mentioned, a voltage pulse of proper phase is initially applied to the grids of the tubes 20, 21, 22 and 23, causing either tubes 20 and 23 or 21 and 22 to fire depending on the polarity of this voltage. This commences the placement of a charge on capacitor 61, and at the same time the application of spurt of voltage to motor winding 35. This charge biases the control grids of the fired tubes whereupon they are caused to cease firing and thereby terminate the voltage spurt. This voltage spurt is ordinarily insufficient to enable the motor 36 to actuate the rotor winding 18 to the balanced position. Consequently, a second voltage pulse of the same phase is applied to the grids of the tubes causing the same pair to fire again. Once more capacitor 61 commences to take on a charge, and a spurt of voltage is started to the motor winding 35. The charge biases the control grids of the fired tubes, causing them to cease firing and thereby terminate the voltage spurt. This voltage spurt may also be insufficient to enable the motor 36 to return the rotor winding 18 to the balanced position. Accordingly, the intermittent tube firing and voltage spurts are continued and thereby the motor 36 is caused to rotate the rotor winding 18 in small stages until the balanced position of transformer 15 is attained. During the periods when the tubes are not firing, the charge on capacitor 61 leaks off through resistor 60 to ground 66 so that the magnitude of the voltage impressed on the control grids of the tubes is adequate to cause one pair of tubes to fire.

To take a second illustration: For a rotation of the rotor winding 18 beyond 3 degrees in either direction in response to a similar change in the ship's course or an actuation of the handwheel 10 as previously pointed out, a voltage pulse of proper phase applied to tubes 20, 21, 22 and 23 causes one pair of them to ionize as previously pointed out and thereby cause a voltage spurt to be supplied to the motor winding 35 until the motor 36 attains full speed. At the same time the placement of a charge on capacitor 61 is commenced. Both the application of the voltage spurt to the winding 35 and the placement of the charge on the capacitor 61 continue until the motor 36 has returned the rotor winding 18 approximately within 3 degrees of its balanced position. At this point the charge on capacitor 61 so biases the fired tubes that they cease firing to terminate the voltage spurt to the motor winding 35. Although the charge on capacitor 61 leaks off through resistor 60 to ground 66 during the non-firing periods of the tubes, the charge remaining on the capacitor 61 is sufficient to prevent the tubes from firing in response to the voltage applied to their control grids due to the unbalanced condition of the transformer 15, once the rotor winding 18 gets within 3 degrees of its balanced position. Thereafter, the inertia of the mechanical system causes the rotor winding 18 to return to the balanced position without hunting or excessive overrunning.

What is claimed is:

1. A motor control system comprising an object adapted for rotation, means including a motor for rotating said object; a source of electrical voltage, means including a plurality of gaseous discharge tubes for controlling the effective connection of said source to said motor and the effective disconnection of said source from said motor, said tubes being normally biased to the non-fired condition, means for supplying an operating voltage of varying magnitude and sign to said controlling means to fire preselected tubes whereby said controlling means is caused to connect said source to said motor means and to apply the voltage of said source with a certain polarity to said motor means to effect the rotation of said object in a predetermined direction, said supplying means including a rotor actuated by said motor means to a position at which no operating voltage is supplied to said controlling means and at which said controlling means effectively disconnects said source from said motor means, and inertialess means operated by said controlling means during the firing of said preselected tubes for augmenting the normal bias on said tubes to restore said preselected tubes to the non-fired condition and thereby causing said controlling means to effectively disconnect said source from said motor when said rotor is a predetermined angular distance from its no-voltage position, the inertia of said system thereafter causing said rotor to coast through the predetermined distance to its no-voltage position without substantial overshooting.

2. A control system according to claim 1 in which said inertialess means includes a capacitor connected to said controlling means for receiving a charge therefrom during the time interval when said preselected tubes are fired and said controlling means effectively connects said source to said motor, and the voltage of the charge on said capacitor augments the normal bias on said tubes to restore said preselected tubes to the non-fired condition and thereby causes said controlling means to effectively disconnect said source from said motor when said rotor attains the predetermined angular distance with reference to said no-voltage position.

3. A control system according to claim 1 in which said controlling means comprises a plurality of gaseous discharge tubes each including a control grid, a cathode and an anode, circuit means for connecting said anodes, cathodes and source in circuit, other circuit means for connecting said control grids and supplying means in circuit, certain of said tubes firing when the voltages effective in their control grid and their anode and cathode circuits have one sign and others of said tubes firing when the voltages effective in their control grid and their anode and cathode circuits have the opposite sign, said certain tubes supplying a voltage of one polarity from said source to said motor to effect its rotation in a given direction and said other tubes supplying a voltage of opposite polarity from said source to said motor to effect its rotation in an opposite direction, said motor actuating said rotor in opposite rotary directions to its no-voltage position, and said inertialess means includes an R.-C. network, further circuit means to connect a first terminal of said network to said cathodes, and additional circuit means for connecting a second terminal of said network to ground, the capacitor of said network taking on a charge during the firing of either said certain or other tubes, the voltage of the charge on the capacitor augmenting the normal bias on the control grids of said tubes thereby causing the respective certain or other tubes to cease firing when said rotor has attained the predetermined angular distance from its no-voltage position.

4. A motor control system comprising an object adapted for rotation, means including a motor for rotating said object, a source of alternating voltage, means including a plurality of gaseous discharge tubes for controlling the effective connection of said source to said motor and the effective disconnection of said source from said motor, said tubes being normally biased to the deionized condition to disconnect said source from said motor means, means for supplying an operating voltage of varying magnitude and sign to said controlling means whereby said last mentioned means is caused to ionize preselected tubes to connect said source to said motor means with predetermined voltage signs and predetermined time durations, said supplying means including a rotor movable by said motor means to a position at which said supplying means is caused to supply no operating voltage to said controlling means, said last mentioned means being caused by the no-voltage position of said rotor to maintain said preselected tubes to the deionized state and thereby to disconnect said source from said motor, and inertialess means including a storage circuit for electrical energy, said circuit taking on a charge of electrical energy when said controlling means is caused to ionize said preselected tubes to connect said source to said motor, said controlling means being so responsive to the voltage of said circuit as to increase the normal bias on said tubes whereby said preselected tubes are deionized to disconnect said source from said motor when said rotor has been moved to a further position lying a predetermined distance in advance of the no-voltage position, the inertia of said system thereafter moving said rotor from said further position to the no-voltage position without substantial overshooting.

5. In an object rotating system, means for rotating said object, a source of alternating voltage, a plurality of gaseous discharge devices, each including a control grid, a cathode and an anode, for connecting the voltage of said source to said rotating means with different signs, said control grids being normally biased to establish the deionized condition therein and thereby to disconnect said source from said rotating means, means for supplying to said control grids a voltage having a predetermined magnitude in response to an action of preselected amount and having a sign indicative of the direction of said action, said supplying means having a condition at which no voltage is supplied to said control grids, means for connecting said source, anodes, rotating means and supplying means in circuit so that certain devices ionize when the voltages applied concurrently to their control grids and anodes have one sign and so that other devices ionize when the voltages applied concurrently to their control grids and anodes have the opposite sign, means capable of movement to a position at which the no-voltage condition is established in said supplying means, said rotating means being responsive to the ionization of said certain or other devices to rotate said object to an amount proportional to the preselected amount of said action and in a direction corresponding to the direction of said action, said rotating means simultaneously with the rotation of said object also moving said movable means to establish the no-voltage condition in said supplying means, and means compensating for the inertia of said system, comprising a capacitor and a resistive means connected to said cathodes of said devices, said capacitor being charged when said certain or other devices are ionized, the voltage of the charge on said capacitor supplying additional bias to said control grids thereby causing the ionized devices to return to the deionized condition when said movable means has been moved to a predetermined distance in advance of the no-voltage position, thereafter the inertia of said system moving said movable means through the predetermined distance to the no-voltage position without substantial overshooting, said resistive means dissipating the charge on said capacitor when all said devices are in the deionized condition.

6. In combination with a system for rotating an object comprising means for rotating said object, a source of alternating voltage, means including a plurality of gaseous discharge tubes operable in response to a further voltage for applying the voltage of said source with different signs to said rotating means, said operable means being normally biased to the unoperated condition so as to maintain said tubes deionized and thereby to withhold the voltage of said source from said rotating means, means for supplying the further voltage with a predetermined magnitude and sign to said operable means for ionizing preselected tubes thereby operating said last mentioned means in response to an action of a preselected amount and direction in such manner that the predetermined magnitude of the further voltage is proportional to the preselected amount of said action and in such manner that the predetermined sign of the further voltage is indicative of the preselected direction of said action, means capable of movement to a position at which said further voltage means terminates the further voltage, means for connecting said source, rotating means, operable means and further voltage means in circuit, said rotating means rotating said object to an amount and direction corresponding to the preselected amount and direction, respectively, of said action in response to the voltage of said source as controlled by said operable means, said rotating means simultaneously with the rotation of said object also moving said movable means until said further voltage means terminates the further voltage supplied to said operable means, and means compensating for the inertia of said system to prevent substantial overshooting of said movable means, comprising means for storing electrical energy when said preselected tubes are ionized and said operable means is applying the voltage of said source to said rotating means, the voltage of the stored energy augmenting the normal bias on said operable means thereby causing said operable means to return to the unoperated condition by deionizing said preselected tubes when said movable means has been moved to a further position lying a predetermined distance in advance of the first-mentioned position, thereafter the inertia of said system moving said movable means from said further position to the first-mentioned position without substantial overshooting.

JOHN H. BOLLMAN.

REFERENCES CITED

The following references are of record in the file of this patent:

UNITED STATES PATENTS

| Number | Name | Date |
| --- | --- | --- |
| 2,002,353 | Reinken | May 21, 1935 |
| 2,020,275 | Beers | Nov. 5, 1935 |
| 2,040,014 | Moseley | May 5, 1936 |
| 2,276,816 | Bagno | Mar. 17, 1942 |
| 2,384,380 | Isserstedt | Sept. 4, 1945 |